United States Patent
Luo et al.

(10) Patent No.: US 12,169,477 B2
(45) Date of Patent: Dec. 17, 2024

(54) UNRELIABLE EDGE

(71) Applicant: NATIONAL UNIVERSITY OF DEFENSE TECHNOLOGY, Changsha (CN)

(72) Inventors: Lailong Luo, Changsha (CN); Geyao Cheng, Changsha (CN); Deke Guo, Changsha (CN); Junxu Xia, Changsha (CN); Bowen Sun, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 11 days.

(21) Appl. No.: 18/138,144

(22) Filed: Apr. 24, 2023

(65) Prior Publication Data
US 2024/0126722 A1 Apr. 18, 2024

(30) Foreign Application Priority Data
Oct. 13, 2022 (CN) .......................... 202211255400.8

(51) Int. Cl.
| | |
|---|---|
| G06F 16/174 | (2019.01) |
| G06F 16/16 | (2019.01) |
| G06F 16/17 | (2019.01) |
| G06F 16/172 | (2019.01) |
| G06F 16/182 | (2019.01) |

(52) U.S. Cl.
CPC ........ G06F 16/1748 (2019.01); G06F 16/172 (2019.01)

(58) Field of Classification Search
CPC ........................... G06F 16/1748; G06F 16/172
See application file for complete search history.

(56) References Cited

U.S. PATENT DOCUMENTS

| | | | | |
|---|---|---|---|---|
| 7,185,001 B1 * | 2/2007 | Burdick | ................ | G06F 16/355 |
| | | | | 707/999.005 |
| 9,015,120 B1 * | 4/2015 | Dutch | ................... | G06F 16/113 |
| | | | | 707/640 |
| 9,075,722 B2 * | 7/2015 | Naik | ..................... | G06F 16/172 |

(Continued)

OTHER PUBLICATIONS

Ruikun Luo, et al., Graph-Based Data Deduplication in Mobile Edge Computing Environment, ICSOC 2021, LNCS 13121, 2021, pp. 499-515.

(Continued)

*Primary Examiner* — Etienne P Leroux
(74) *Attorney, Agent, or Firm* — Bayramoglu Law Offices LLC

(57) ABSTRACT

A method and system for deduplication caching using an unreliable edge resource include acquiring a total storage capacity of all edge servers, searching for candidate cache files by a similarity-based hierarchical clustering (SHC) method, and acquiring file clusters of all the candidate cache files after clustering, where the candidate cache files each include a deduplicated data chunk, and based on the file clusters and an reliability of all of the edge servers, selecting, by a heuristic algorithm, a file cluster from the file clusters to cache to the edge server until a size of cached content reaches the total storage capacity. The present disclosure makes a trade-off between file availability and space efficiency, thereby effectively improving the cache hit rate in the limited edge caching space.

18 Claims, 8 Drawing Sheets

(56) References Cited

U.S. PATENT DOCUMENTS

| | | | | |
|---|---|---|---|---|
| 9,189,408 | B1* | 11/2015 | Douglis | G06F 12/121 |
| 9,619,388 | B2* | 4/2017 | Zhang | H04L 67/568 |
| 10,445,286 | B1* | 10/2019 | Nijim | H04N 21/222 |
| 2021/0203745 | A1* | 7/2021 | Chen | H04L 67/568 |
| 2021/0382852 | A1* | 12/2021 | Stokely | G06F 16/182 |
| 2022/0109713 | A1* | 4/2022 | Huang | G06N 20/00 |

OTHER PUBLICATIONS

Geyao Cheng, et al., LOFS: A Lightweight Online File Storage Strategy for Effective Data Deduplication at Network Edge, IEEE Transactions on Parallel and Distributed Systems, 2022, pp. 2263-2276, vol. 33, No. 10.

Lingjun Pu, et al., Online Resource Allocation, Content Placement and Request Routing for Cost-Efficient Edge Caching in Cloud Radio Access Networks, IEEE Journal on Selected Areas in Communications, 2018, pp. 1751-1767, vol. 36, No. 8.

* cited by examiner

UNRELIABLE EDGE

CROSS-REFERENCE TO THE RELATED APPLICATION

This application is based upon and claims priority to Chinese Patent Application No. 202211255400.8, filed on Oct. 13, 2022, the entire content of which is incorporated herein by reference.

TECHNICAL FIELD

The present disclosure belongs to the technical field of edge storage, and relates to a method and system for deduplication caching using an unreliable edge resource.

BACKGROUND

In the context of exponential growth of digital data, the deduplication technique has emerged, and has received increasing attention in edge caching in order to achieve high space efficiency. In a typical chunk-level deduplication process, a file or data stream is divided into chunks of a fixed or variable size, and fingerprints of the chunks are calculated. Chunks with unique fingerprints are stored, and duplicate chunks are deleted. Li et al. model file similarity as a δ-similarity graph, and distribute more popular (hotter) files to the edge for the purpose of space saving by deduplication. Luo et al. propose a method for maximizing the deduplication rate under a graph-based latency constraint. In the field of lightweight online file storage (LOFS), a lightweight three-layer hash mapping method is designed to distribute the most similar files to the same edge server so as to better eliminate redundancy. These methods attempt to improve space efficiency based on similarities between files, and allow more popular files to be cached on the edge. However, they focus more on space efficiency and always consider their edge servers reliable.

Expanding storage space is another way to cache more files on the edge. Due to the diversity of edge resources, many studies suggest expanding edge caching space through various available resources, even unreliable resources. For example, Pu et al. propose the use of edge caching in a cloud radio access network (C-RAN) to facilitate mobile multimedia services. Liu et al. propose a cost-effective edge storage system using an embedded storage node. The existing literature further emphasizes the use of various idle and reserved resources to achieve cost-effective space expansion. However, at present, the traditional methods have the technical problem of low cache hit rates.

SUMMARY

To solve the problem existing in traditional methods, the present disclosure proposes a method and system for deduplication caching using an unreliable edge resource. The present disclosure makes a trade-off between file availability and space efficiency, and improves the cache hit rate in the limited edge caching space.

To achieve the above objective, embodiments of the present disclosure adopt the following technical solutions.

An aspect of the present disclosure provides a method for deduplication caching using an unreliable edge resource, including the following steps:
acquiring a total storage capacity of all edge servers;
searching for candidate cache files by a similarity-based hierarchical clustering (SHC) method, and acquiring file clusters of all the candidate cache files after clustering, where the candidate cache files each include a deduplicated data chunk; and
based on the file clusters and the reliability of all of the edge servers, selecting, by a heuristic algorithm, a file cluster from the file clusters to cache to the edge server until a size of cached content reaches the total storage capacity.

Another aspect of the present disclosure further provides a system for deduplication caching using an unreliable edge resource, including the following modules:
a storage capacity acquisition module configured to acquire a total storage capacity of all edge servers;
a hierarchical clustering module configured to search for candidate cache files by an SHC method, and acquire file clusters of all the candidate cache files after clustering, where the candidate cache files each include a deduplicated data chunk; and
a selection and caching module configured to select, based on reliability of all the edge servers and by a heuristic algorithm, a file cluster from the file clusters to cache to the edge server until a size of cached content reaches the total storage capacity.

Any of the above technical solutions has the following beneficial effects:

The present disclosure acquires the total storage capacity of all the edge servers, searches for the candidate cache files of all non-duplicate data chunks by the SHC method, and acquires the file clusters of all the candidate cache files generated through hierarchical clustering. The present disclosure selects a file cluster by the heuristic algorithm and caches the file cluster on the edge server until the size of the cached content reaches the total storage capacity. The present disclosure selects the cache file by comprehensively considering the popularity and similarity of the file and the reliability of the edge servers, so as to improve the availability of a hotter file. The present disclosure reduces the additional space occupied through deduplication and redundancy, and improves space efficiency. In addition, the present disclosure makes a trade-off between the file availability and space efficiency, thereby effectively improving the cache hit rate in the limited edge caching space.

BRIEF DESCRIPTION OF THE DRAWINGS

To describe the technical solutions in the embodiments of the present disclosure or in the conventional art more clearly, the following briefly describes the drawings required for describing the embodiments or the conventional art. Apparently, the drawings in the following description show merely some embodiments of the present disclosure, and a person of ordinary skill in the art may still derive other drawings from these drawings without creative efforts.

shows the impact of reliability on the cache hit rate; and FIG. 4(b) shows the impact of replica number on the cache hit rate;

FIG. 5(a) shows a sorting index; and FIG. 5(b) shows a clustering result;

FIG. 7(a) shows a cache hit rate; and FIG. 7(b) shows a mean retrieval latency;

FIG. 8(a) shows a cache hit rate; and FIG. 8(b) shows a mean retrieval latency.

DETAILED DESCRIPTION OF THE EMBODIMENTS

Figures 1, 2:
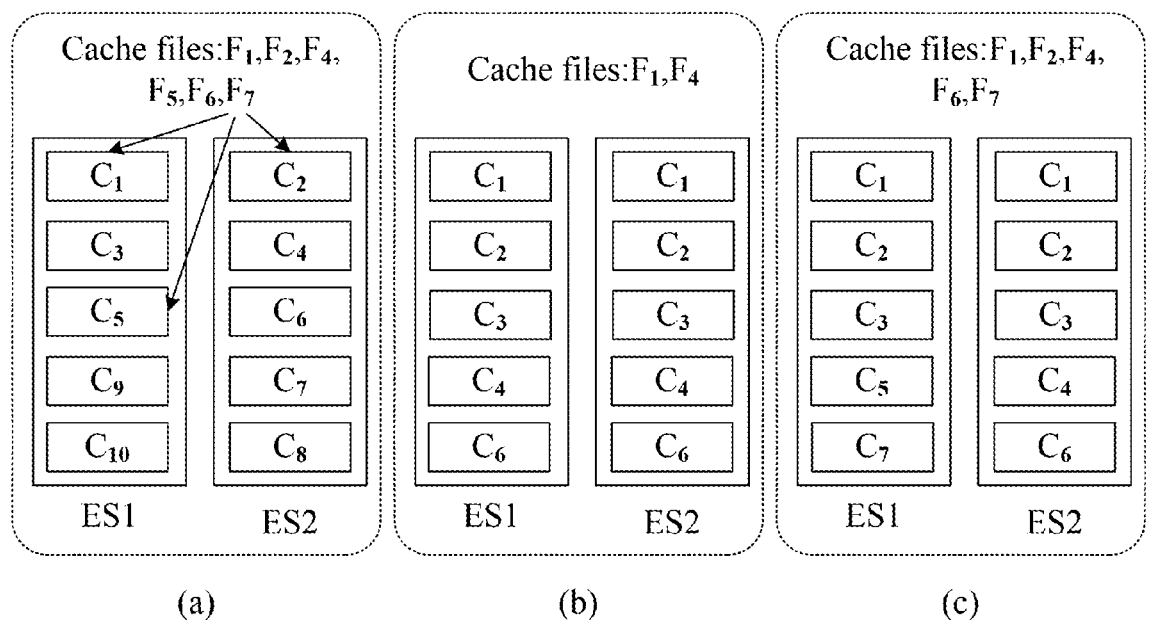
FIG. 1 is a schematic diagram of a file set according to the present disclosure.
FIG. 2 is a schematic diagram of distribution schemes of MEAN and comparative methods according to an embodiment of the present disclosure, where (a) shows a deduplication-aware data chunk distribution scheme; (b) shows a reliability-aware data chunk distribution scheme; and (c) shows a MEAN data chunk distribution scheme.

To make the objectives, technical solutions, and advantages of the present disclosure clearer, the present disclosure is further described in detail below with reference to the drawings and embodiments. It should be understood that the specific embodiments described herein are merely used to explain the present disclosure, rather than to limit the present disclosure.

Unless otherwise defined, all technical and scientific terms used herein have the same meaning as commonly understood by those skilled in the technical field of the present application. The terms used in the specification of the present application are merely for the purpose of describing specific embodiments, rather than to limit the present application.

It should be noted that the "embodiment" mentioned herein means that a specific feature, structure, or characteristic described in combination with the embodiment may be included in at least one embodiment of the present disclosure. The term appearing in different parts of the specification does not necessarily refer to the same embodiment or an independent or alternative embodiment exclusive of other embodiments.

It may be appreciated by those skilled in the art that the embodiment described herein may be combined with other embodiments. The term "and/or" as used in the specification of the present disclosure and the appended claims refers to one or any or all possible combinations of multiple associated items that are listed, and includes these combinations.

With the rapid development of latency-sensitive applications, such as augmented reality (AR), the Internet of Things (IoT), and autonomous driving, caching popular files on the edge of the network has become one of the ubiquitous data operations. This can reduce the number of data requests to remote content providers, especially during peak hours, thereby reducing network congestion and shortening service latency. A key indicator of the edge caching system is cache hit rate, which is the percentage of data requests that can be processed on the edge of the network. Therefore, the data of popular files is stored on the edge server.

Currently, the edge caching space is limited, unable to cope with the explosive growth of data. Of course, this problem can be solved by renting more proprietary resources, but for content providers, this is not always a cost-effective option, especially during peak hours. Therefore, some studies suggest expanding edge storage space by consolidating various available edge resources, even if some resources are not reliable. These resources can be various idle resources provided by enterprises and individuals, or they can be resources reserved for other applications that are not yet fully utilized. This provides content providers with an economical and fast way to expand storage space. Expanding storage space to store more files can improve the cache hit rate to a certain extent. However, many of these resources are often unreliable. Some edge servers may erase the cached content or disconnect at any time. Therefore, in order to ensure the availability of files, redundant data needs to be generated.

In contrast, some other studies have proposed using deduplication storage technology to cache data. A common practice for deduplication is to divide a file into multiple chunks of fixed/variable size, each chunk requiring only one replica to be maintained. Deduplication can eliminate redundancy in cache files and improve space efficiency. It has been reported that in typical file sharing scenarios, deduplication can save about 50-60% of space. For highly duplicate datasets, this method can achieve a 95% optimization rate or reduce storage utilization by 20 times. Due to the limited edge storage resources available to cache more files, the cache hit rate can be improved to some extent.

The above two methods should be combined in the physical storage system to expand space and use deduplicated chunks when idle. However, the above two methods contradict each other to some extent. On the one hand, deduplication policies stipulate that any data chunk can only be stored once. On the other hand, due to the use of unreliable resources, data should be backed up to seek file availability. It is not uncommon for storage chunks to become unavailable due to hardware failures, software crashes, or space being reclaimed by the application for which they are responsible. This can cause all files that share the chunk to be incomplete and unavailable. Therefore, the key issue is whether to use unreliable space on the edge of the network to store more deduplicated chunks of files or to add redundant chunks to address server failures.

In order to solve the above problem, the present disclosure proposes an edge caching method (referred to as MEAN) that uses an unreliable resource and supports deduplication. In order to achieve a higher cache hit rate, MEAN does not adopt an extreme strategy (neither backing up all chunks nor deduplicating all file chunks), but adopts an intermediate strategy (duplicating some chunks and deduplicating remaining chunks). MEAN comprehensively considers file popularity, file similarity, and server reliability to select cache files. MEAN improves the availability of hotter files and reduces the additional space occupied by means of redundancy. In addition, MEAN tends to deduplicate other files to improve space efficiency.

Examples of MEAN and comparative methods are shown in FIGS. 1 and 2. FIG. 1 is a schematic diagram of a file set. In FIG. 1, there are 8 files ($F_1$ to $F_8$) divided into 12 chunks ($C_1$ to $C_{12}$) based on their popularity (9,2,1,4,1,3,2,1). The cache resource includes edge server 1 (ES1) and edge server 2 (ES2), with a storage size of 5 chunks. The reliability of the two edge servers (ES1 and ES2) is 0.7 and 0.6, respectively.

FIG. 2(a) shows a deduplication-aware data chunk distribution scheme. The most commonly used files are cached, and the deduplicated chunks are evenly distributed on the edge server. This method can improve the cache hit rate. However, it can hardly ensure the availability of the cache files, and the expected cache hit rate is only about 40.7%: $E_h=0.7\times0.6\times(9+2+4+1+2)+0.6\times3=9.36$, and cache hit rate=9.36/23≈40.7%. In fact, many distributed storage systems generally use replication to achieve fault tolerance. Inspired by this, one of the improvements is to add a replica to each hot file, which refers to a reliability-aware data chunk distribution scheme, as shown in FIG. 2(b). However, due to the decrease in the number of cache files, the expected cache hit rate is only slightly improved (about 49.7%): $E_h=(1-0.3\times0.4)\times(9+4)=11.44$, and cache hit rate=11.44/23≈49.7%. FIG. 2(c) shows a data chunk distribution scheme of MEAN. This is a relatively good solution, with a maximum cache hit rate of about 66.2%: $E_h=(1-0.3\times0.4)\times 9+0.7\times(2+3+2)+0.6\times4=15.22$, and cache hit rate=15.22/2366.2%. This solution eliminates some redundancy to free up the caching space, and replicas the hottest file F1 to improve the file availability. Therefore, the scheme shown in FIG. 2(c) can make a trade-off between space efficiency and file availability. The advantage of MEAN is that it can dynamically select the cache file, determine the location and number of replicas of each cache chunk, and consider both space efficiency and file availability.

The implementations of the present disclosure are described in detail below according to the drawings of the embodiments of the present disclosure.

Figure 3:
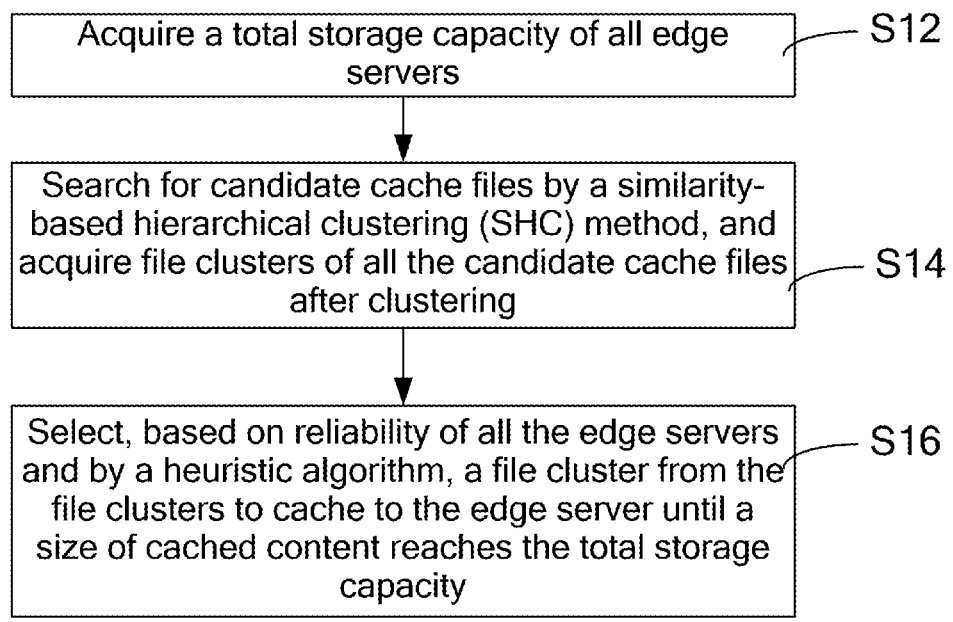
FIG. 3 is a flowchart of a method for deduplication caching using an unreliable edge resource according to an embodiment of the present disclosure.

Referring to FIG. 3, an embodiment of the present disclosure provides a method for deduplication caching using an unreliable edge resource, including steps S12 to S16.

S12. A total storage capacity of all edge servers is acquired.

It can be understood that during the execution of edge storage tasks, the total storage capacity of all the edge servers available in the current application scenario can be acquired through manual settings or online automatic reading. In practical studies, although the methods of improving space efficiency and file availability can effectively improve the cache hit rate, the combination of the methods poses thorny challenges. In order to explore the relationship between space efficiency and file availability, the present disclosure tests the reliability of different servers and the cache hit rate of chunk replicas. In the present disclosure, the dataset is downloaded from an existing website and 10 virtual machines (VMs) are set up as edge cache servers. In each round of testing, the VM is randomly shut down based on its reliability, and 1,000 file retrieval requests are generated on a new VM. If the required file can be retrieved from the VM, it is considered a cache hit. Otherwise, it is considered as a cache miss. The results are generated from the mean of 100 rounds of testing.

Figure 4A:
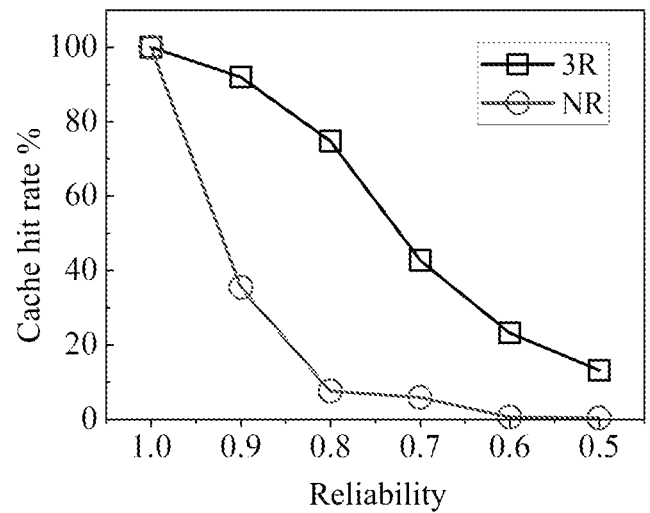
FIGS. 4(a) and 4(b) is a schematic diagram of impacts of reliability and replica number on a cache hit rate according to an embodiment of the present disclosure, where FIG. 4(a)

FIG. 4(a) shows the cache hit rates corresponding to different reliability. The first method is a non-replica deduplication caching method, denoted NR, where unique chunks are randomly distributed across 10 VMs. The second method is a 3-replica method, denoted 3R, where each deduplicated chunk requires 3 replicas to be maintained in different VMs to achieve fault tolerance. As shown in FIG. 4(a), when the reliability of the server decreases from 1.0 to 0.8, the cache hit rate of NR rapidly decreases from 100% to 7.56%. In contrast, when the reliability of the server is reduced to 0.8, the cache hit rate of 3R remains at a high level (74.80%). Therefore, redundancy can have a positive impact on the cache hit rate to a certain extent.

Figure 4B:
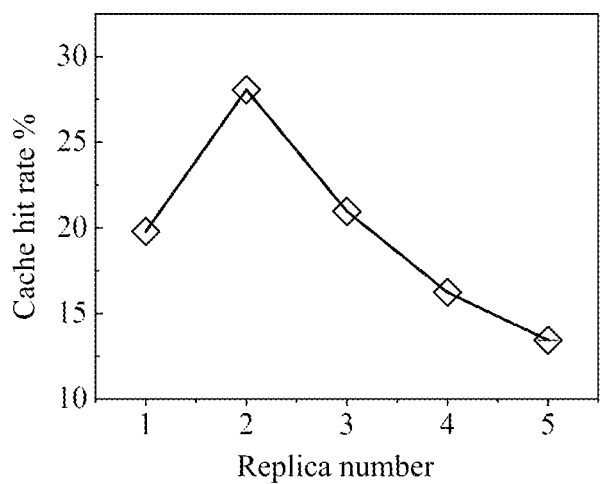

However, if the replica of the chunk is arbitrarily supplemented, redundancy will occupy additional space and crowd out the originally cached content, thereby affecting the improvement of cache hit rate. For this reason, the present disclosure conducts a further test to observe the impact of the number of replicas, and the results are shown in FIG. 4(b). In this test, the total storage space of the 10 VMs is set to 40% of the dataset size, and the reliability of each VM is fixed at 0.8. When a replica is added for each data chunk, the cache hit rate begins to increase. However, excessive redundancy can waste a large amount of the limited storage space. Therefore, when the number of the replicas of the data chunk increases from 2 to 5, the cache hit rate decreases from 28.07% to 13.42%.

According to the above test results, the unreliability of the edge server can have a significant negative impact on the cache hit rate of deduplication caching, and replicas are a double-edged sword. Therefore, when deduplication caching is implemented using an unreliable storage resource, it is necessary to make a trade-off between deduplication and replication. This problem is hard to solve by traditional methods, and when the file popularity and the heterogeneity of server reliability are further considered, the complexity of the problem increases exponentially.

For this reason, MEAN improves the file availability through replication, and eliminates unnecessary redundancy through deduplication to improve space efficiency. MEAN utilizes existing cached content to supplement the replica of the data chunk based on the popularity of different files and data sharing dependencies. In addition, MEAN considers the location of the chunk to further improve file availability under the premise of reliability of heterogeneous servers.

Problem Description:

$F=\{f_1, f_2, \ldots\}$ denotes a group of files with a heat rate of $H_S=\{h_1, h_2, \ldots\}$. $C=\{c_1, c_2, \ldots\}$ denotes a set of non-duplicate data chunks of all the files in F. Bool variable $x_{i,j}$ denotes an inclusion relationship, where $x_{i,j}=1$ means that chunk $c_j$ is included in the file $f_i$. Some files in F are cached on the edge to facilitate data requests and reduce retrieval latencies. This deployment can be conducted during periods of low traffic to reduce traffic pressure on the backbone network. The edge resource is composed of a group of servers $S=\{S_1, S_2, \ldots\}$ with a storage capacity of $M_S=\{M_1, M_2, \ldots\}$. Bool variable $y_{j,k}$ means that the chunk $c_j$ is cached on the edge server $S_k$. The replication of a file multiple times on one edge server is not considered, as this does not benefit access performance, but rather exacerbates data redundancy. $size(c_j)$ denotes the size of the chunk $c_j$, so the storage overhead of the edge server $S_k$ is the total size of the chunks cached on it, that is, $size(S_k)=\Sigma_{c_j \in B} y_{j,k} \times size(c_j)$.

A cache file is considered hit only if all related chunks of the cache file are available on the edge. This depends on two key conditions. The first condition is that all relevant file chunks are cached on the edge. $\alpha_i$ indicates whether this condition is satisfied. If $\alpha_i=1$, any chunk $c_j$ of the file $f_i$ is cached on at least one edge server, that is, $x_{i,j} \times \Sigma_{k=1}^{|S|} y_{j,k} \geq 1$. The file $f_i$ includes a total of $\Sigma_{j=1}^{|B|} x_{i,j}$ chunks. Therefore, Bool variable $\alpha_i \in \{0,1\}$, $\forall f_i \in F$ can be determined by Eq. (1):

$$\alpha_i = \begin{cases} 1, & \text{if } \Sigma_{j=1}^{|B|} x_{i,j} \times \text{Bool}\left(\Sigma_{k=1}^{|S|} y_{i,j}\right) = \Sigma_{j=1}^{|B|} x_{i,j} \\ 0, & \text{else} \end{cases} \quad (1)$$

If the variable of a Bool function is not 0, the function returns "1".

The second condition is that each chunk of the file $f_i$ is available on at least one of the $\Sigma_{k=1}^{|S|} y_{j,k}$ edge servers that cache the chunk $c_j$. In this example, assume that the server reliability is R={$r_1, r_2, \ldots$} P($f_i$,x,y,R) denotes the availability of the file $f_i$ corresponding to the server reliability R. It also depends on the data sharing dependency between the cache files (Bool value x), and is closely related to the location of the chunk and its replica (Bool value y). In general, the value of P($f_i$,x,y,R) can be roughly estimated as the reliability product of the cache servers:

$$P(f_i,x,y,R) = \Pi_{S_k \in S(i)} r_k \qquad (2)$$

S(i) denotes a smallest set of the servers that cover all the chunks of the file $f_i$.

Based on the Bool variables regarding the files and chunks, the cache problem can be described as follows:

1. When a file is cached ($\alpha_i=1$), all its chunks have at least one replica in the edge storage:

$$\Sigma_{k=1}^{|S|} y_{j,k} \geq \alpha_i \times x_{i,j}, \quad \forall f_i \in F, \forall c_j \in C \qquad (3)$$

2. When the chunk $c_j$ is not the chunk that makes up any cache file, it is not necessary to cache it on the edge. In addition, for any chunk that requires caching, it has a maximum of |S| replicas stored on the edge:

$$\Sigma_{k=1}^{|S|} y_{j,k} \geq |S| \times \Sigma_{i=1}^{|F|} \alpha_i \times x_{i,j}, \quad \forall c_j \in C \qquad (4)$$

3. The total size of chunks stored on each edge server does not exceed the storage capacity of the edge server:

$$\Sigma_{c_j \in C} y_{j,k} \times size(c_j) \leq M_k, \quad \forall s_k \in S \qquad (5)$$

4. The state variables are all Bool variables:

$$\alpha_i, x_{i,j}, y_{j,k} \in \{0,1\}, \quad \forall f_i \in F, \forall c_j \in C, \forall s_k \in S \qquad (6)$$

The optimization goal of MEAN, namely, a maximum cache hit rate, is acquired as follows:

$$\max \frac{\sum_{f_i \in F} \alpha_i h_i P(f_i, x, y, R)}{\sum_{f_i \in F} h_i} \qquad (7)$$

This requires an appropriate trade-off between space efficiency and file availability. Space efficiency is described as maximizing the number of cache files, namely $\alpha_i$. File availability can be expressed by maximizing the reliability of each cache file, that is P($f_i$, x, y, R). In addition, due to the low latency characteristic of edge access, when caching popular files on the edge, more data requests can be responded to per unit time, that is, $h_i$ is proportional to the cache hit rate. In summary, the cache problem can be described as a problem model with Eq. (7) as the cache target and Eqs. (3) to (6) as constraints.

S14. Candidate cache files are searched for by a similarity-based hierarchical clustering (SHC) method, and file clusters of all the candidate cache files after clustering are acquired, where the candidate cache files each include a deduplicated data chunk.

S16. Based on reliability of all the edge servers, a file cluster is selected by a heuristic algorithm to cache on the edge server until a size of cached content reaches the total storage capacity.

It can be understood that each step of MEAN is to choose the most profitable caching scheme (caching new files or multiple replica chunks) until the caching space is filled up. Sorting index $h \times \Delta P / \Delta c$ is defined as a hit gain per unit of caching space. Files with higher index rankings are prioritized for caching, where h denotes the popularity (also known as heat rate) of the file, $\Delta P$ denotes an increment in file availability, and $\Delta c$ denotes additional space overhead.

There are two main shortcomings when directly using the sorting index to search for candidate cache files. First, for a large number of candidate files, the search process is time-consuming, especially when calculating the value of $\Delta c$ by comparing the chunks between the candidate file and the cached content. In addition, since the value of $\Delta c$ is updated after each cache decision as cache chunks increase, the calculation is repeated. Second, the value of $\Delta c$ is determined based on differences from existing cache data. If some files can form a cluster with a high heat rate, but they share fewer chunks with the current cache file, they can hardly be selected to cache on the edge, which is likely to affect the processing effect of MEAN.

Figure 5A:
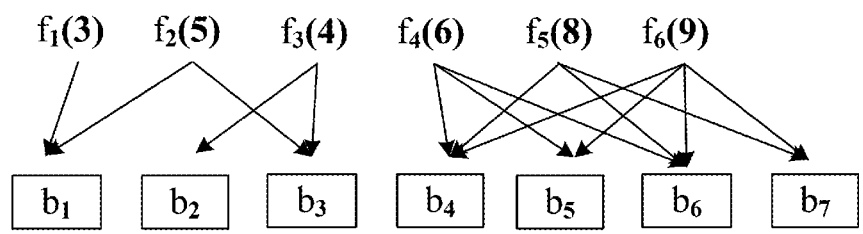
FIGS. 5(a) and 5(b) is a schematic diagram of a hierarchical clustering algorithm according to an embodiment of the present disclosure, where

For example, as shown in FIG. 5(a), according to the sorting index, the files $f_1$, $f_2$, and $f_3$ are sequentially selected for caching on the edge. However, despite the obvious caching advantage, the clusters $f_4$, $f_5$, and $f_6$ that share many chunks with each other and are highly popular are not selected by the algorithm for storage on the edge. The reason is that the sorting indexes of these three files are relatively large when the first file is selected. In addition, these three files and the selected initial cache file share fewer chunks, resulting in the suboptimal solution.

In order to address the two shortcomings mentioned above, the SHC method is adopted. The hierarchical clustering of SHC is an iterative clustering process. In each iteration, when the sorting index of two files (clusters) after clustering is greater than the sorting indexes of the two files before clustering, the most similar pair of files is merged into a new cluster. After the iteration, a file cluster is acquired.

SHC is an effective method for accelerating cluster generation and index calculation. Based on this, an effective heuristic algorithm is proposed to improve the cache hit rate of deduplication caching in an unreliable edge environment. The present disclosure considers three heterogeneous scenarios to illustrate the implementation of MEAN, where the latter scenario is a generalization of the previous scenario. The heterogeneous scenario includes: 1) all the edge servers are reliable; 2) all the edge servers have the same reliability; and 3) all the edge servers have heterogeneous reliability.

The method acquires the total storage capacity of all the edge servers, searches for the candidate cache files of all non-duplicate data chunks by the SHC method, and acquires the file clusters of all the candidate cache files generated through hierarchical clustering. The method selects a file cluster by the heuristic algorithm and caches the file cluster on the edge server until the size of the cached content reaches the total storage capacity. The method selects the cache file by comprehensively considering the popularity and similarity of the file and the reliability of the edge servers, so as to improve the availability of a hotter file. The method reduces the additional space occupied through deduplication and redundancy, and improves space efficiency. In addition, the method makes a trade-off between the file availability and space efficiency, thereby effectively improving the cache hit rate in the limited edge caching space.

Figure 6:
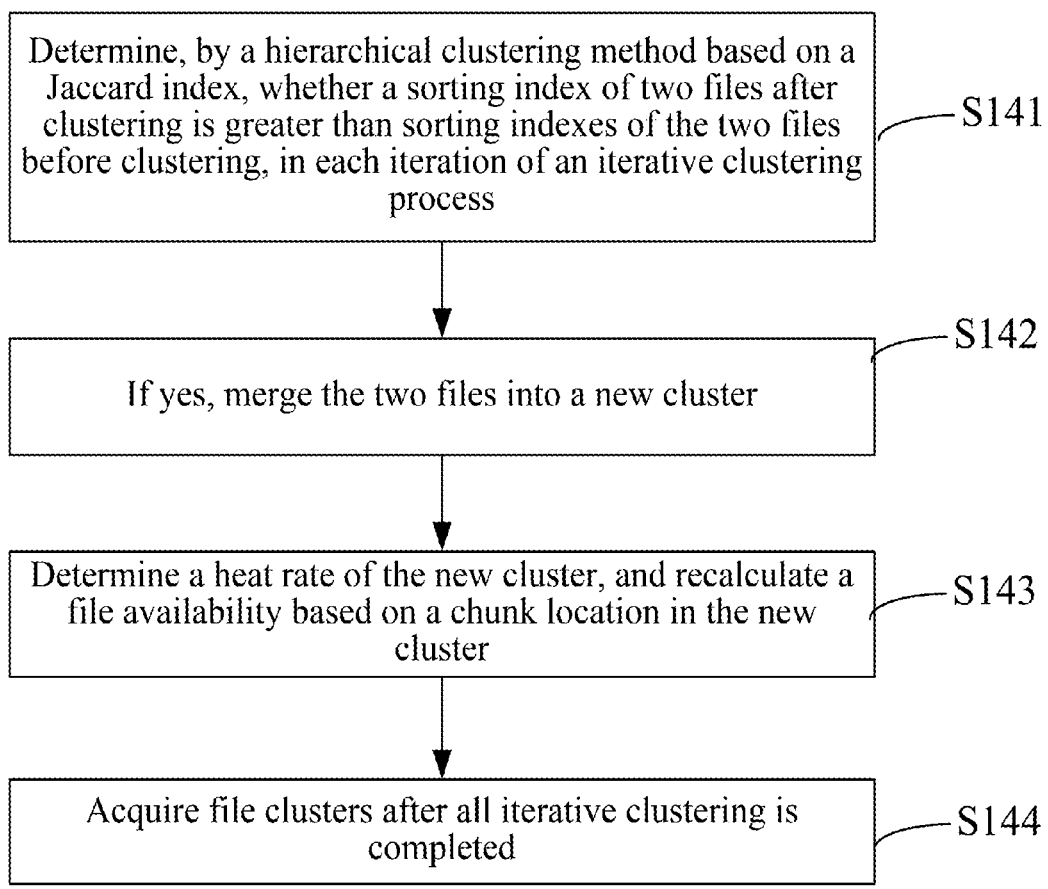
FIG. 6 is a flowchart of hierarchical clustering according to an embodiment of the present disclosure.

In an embodiment, as shown in FIG. 6, S14 may include the following process.

S141. In each iteration of the iterative clustering process, it is determined whether the sorting index of two files after clustering is greater than the sorting indexes of the two files before clustering by a hierarchical clustering method based on a Jaccard index.

S142. If yes, the two files are merged into a new cluster.

S143. The heat rate of the new cluster is determined, and the file availability is recalculated based on the location of the chunks in the new cluster.

S144. Each file cluster is acquired after all iterative clustering is completed.

It can be understood that the hierarchical clustering process relies on a similarity function that indicates which pair of clusters to merge in each iteration. Therefore, the commonly used Jaccard index is used as the similarity function. For two clusters A and B, their Jaccard value is denoted as $$J(A, B) = \frac{|A \cap B|}{A \cup B}.$$

The heat rate h after clustering is the total heat rate of the two original files (clusters), and c denotes the size of the two original files (clusters) merged into one. The file availability P can be directly recalculated based on the location of chunks in the cluster. In this way, the number of generated sets is significantly less than the number of original files, thereby reducing computational complexity.

Figure 5B:
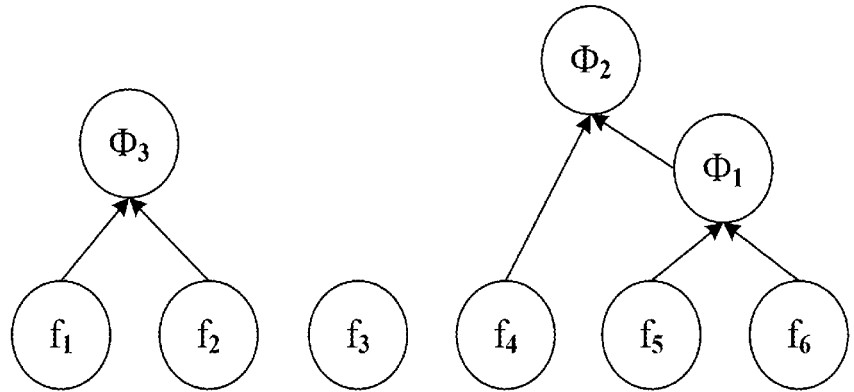

For example, in FIG. 5(b), the files $f_5$ and $f_6$ have the largest Jaccard value, $J(f_5, f_6)=¾$, and are merged into the first cluster $\Phi_1$. Then, $\Phi_2$ and $\Phi_3$ are constructed in order, and a final set Z of the three clusters are acquired, that is, $\{\Phi_1, \Phi_2, f_3\}$.

In an embodiment, in step S141, when calculating the Jaccard index, the intersection and union of two file clusters are calculated by comparing chunk fingerprints. The chunk fingerprints are drawn through a Bloom filter (BF).

Specifically, when calculating the Jaccard value, in order to derive the intersection and union of two clusters, chunk fingerprints, for example, encoded by MD5 or SHA-1, are compared. Information comparison also consumes a large amount of computing resources. For example, for a cluster with $|\Phi_2|$ chunks and a cluster with $|\Phi_3|$ chunks, determining the number of shared chunks requires a time complexity $O(|\Phi_2| \times |\Phi_3|)$. To further reduce the computational complexity, BF is used to draw the chunk fingerprints of each cluster. This simplifies the calculation of the Jaccard value from pairwise fingerprint checking to member queries on the cluster sketch. The time complexity of the algorithm can be reduced to $O(|\Phi|k_{BF})$ where $k_{BF}$ denotes the number of hash functions used. For any chunk $c_j$ in $\Phi_i$, if any bit of the $k_{BF}$ hash position in the BF vector of $\Phi'_i$ is 1, its BF determines that the chunk belongs to $\Phi'_i$.

In an embodiment, if all the edge servers are reliable, in S16, the process that a file cluster is selected by a heuristic algorithm to be cached on the edge server until a size of cached content reaches the total storage capacity may specifically be implemented below.

A BF sketch is acquired for each file cluster.

The sorting index of each file cluster is calculated based on the BF sketch.

File cluster with a maximum sorting index is selected continuously until the size of the cached content reaches the total storage capacity.

All chunks of the cached content are randomly and evenly distributed to each edge server within total storage capacity.

Specifically, if all the edge servers are reliable, that is, $r_1=r_2=\ldots=1$, there is no need to maintain a chunk replica because any chunk is available and the server will not crash. Therefore, the sorting index can be directly simplified to $$h \times \frac{\Delta P}{\Delta c} = h/\Delta c.$$

In addition, the distribution strategy for the cached content no longer affects the file availability, as the user can retrieve these cache chunks on any edge server. In this case, the maximum cache hit rate can be achieved by caching the most popular files, thereby reducing additional space overhead. The BF sketch is drawn using the BF.

The processing goal of this section is to select some of the files to cache on the edge, as shown in Eq. (7). A first cluster with the largest h/c is selected. Subsequently, the sorting indexes h/$\Delta$c of all file clusters $\Phi_i \in \Phi$ is calculated, where $\Delta c = \text{size}(\Phi_i - \Omega \cap \Phi_i)$ is derived from the intersection operation between the cached content $\Omega$ and the current cluster $\Phi_i$. The file cluster with a maximum sorting index is selected continuously until the size size($\Omega$) of the cached content reaches the total storage capacity $M = \Sigma M_k$. It should be noted that the cached content $\Omega$ and file cluster $\Phi$ should be updated during each round of cluster selection. Finally, the chunks of the cached content $\Omega$ are randomly and evenly distributed to the edge server within the storage capacity.

In an embodiment, if all the edge servers have same reliability, in S16, the process that a file cluster is selected by a heuristic algorithm to be cached on the edge server until a size of cached content reaches the total storage capacity may specifically be implemented below.

For any file cluster with a high heat rate, the complete replica of the file cluster is cached to the current edge server.

Specifically, if all the servers have the same reliability, that is, $r_1=r_2=\ldots=r$, the key measure to improve file availability is to cache all chunks of a file on a few or even one server. The reason is that when the number of servers in S(i) (a minimum server set that can cover all the chunks of the file $f_i$) decreases, file availability is enhanced, as expressed by Eq. (2). When the file cluster $\Phi_i$ is selected to cache on the current server $s_{\bar{k}}$, there are three different cases. In particular, if more situations are considered, better solutions can be acquired, but this requires significant iteration time. Therefore, only three scenarios with maximum hit gains are considered.

Case 1, the replica of the complete file cluster $\Phi_i$ is cached. For some popular files, their replicas are maintained to ensure the file availability. In this case, the replica of the complete file cluster $\Phi_i$ is directly cached to the current edge server $s_{\bar{k}}$. The additional space overhead is $\Delta c_i = \text{size}(\Phi_i - \Omega \cap \Phi_i)$. The file availability is improved from $1-(1-r)^\lambda$ to $1-(1-r)^{\lambda+1}$, where $\lambda$ denotes the number of replicas of the file cluster $\Phi_i$ in the previous server.

In an embodiment, if all the edge servers have same reliability, in S16, the process that a file cluster is selected by a heuristic algorithm to be cached on the edge server until a size of cached content reaches the total storage capacity further may specifically be implemented below.

A non-cached portion of the file cluster is cached to the current edge server.

Specifically, if all the edge servers have the same reliability, in Case 2, the non-cached portion of the file cluster $\Phi_i$ is cached. In deduplication caching, some chunks of $\Phi_i$ may already have been cached on the previous edge server. The number of the related servers is denoted as B. To save space, only the remaining portion of $\Phi_i$ can be cached to the current edge server s k where $\Delta c_i = \text{size}(\Phi_i - (\Omega \cup \Omega_{\bar{k}}) \cap \Phi_i)$. $\Omega$ and $\Omega_{\bar{k}}$ denote the content cached by the previous server and the content cached by the current server, respectively. After the remaining portion of $\Phi_i$ is cached, the reliability of the cluster is denoted as $r^{\theta+1}$.

In an embodiment, if all the edge servers have same reliability, in S16, the process that a file cluster is selected by a heuristic algorithm to be cached on the edge server until a size of cached content reaches the total storage capacity further may specifically be implemented below.

A deduplicated portion of the file cluster dispersedly cached on other edge server is cached to the current edge server.

Specifically, if all the edge servers have the same reliability, in Case 3, a portion of the file cluster $\Phi_i$ cached on all previous servers rather than on the current edge server $s_{\bar{k}}$ is cached. After the remaining portion of $\Phi_i$ is cached, the deduplicated portion cached on the previous edge server is cached to the current edge server $s_{\bar{k}}$. This improves the availability of the file cluster $f_i$ from $r^{\theta+1}$ to $r$. The additional space overhead, that is, the increased amount of storage, is expressed as $\Delta c_i = \text{size}(\Phi_i \cap \Omega)$.

For the content cached in each edge server $s_k \in S$, the file to cache to the first server is selected. For any remaining server, the sorting indexes of all the candidate file clusters $\Phi_i \in \Phi$ in the three cases are calculated. The file cluster with the maximum sorting index is continuously selected until the cached content size($\Omega_{\bar{k}}$) reaches the storage capacity $M_{\bar{k}}$.

In an embodiment, if all the edge servers are heterogeneously reliable, in S16, the process that a file cluster is selected by a heuristic algorithm to be cached on the edge server until a size of cached content reaches the total storage capacity may specifically be implemented below.

The edge servers are sorted in descending order of reliability, and the file clusters are cached, in descending order of the sorting index, to the edge servers, starting from an edge server with a highest reliability.

It can be understood that if all the edge servers have heterogeneous reliability, that is, $r_1 \neq r_2 \neq \ldots \neq r$, files with higher sorting indexes are cached on servers with higher reliability. Otherwise, the availability of the popular files can only be guaranteed through replicas across multiple unreliable servers, which will additionally consume troves of cache resources. Therefore, the heterogeneous servers are sorted in descending order of reliability, and the files are sequentially cached to the sorted servers. Three different cases of this scenario are analyzed below.

Further, the process that the file clusters are cached to the edge servers, starting from an edge server with a highest reliability, in descending order of the sorting index may specifically be implemented below.

For any file cluster with a high heat rate, the complete replica of the file cluster is cached to the current edge server.

A non-cached portion of the file cluster is cached to the current edge server.

A deduplicated portion of the file cluster dispersedly cached on other edge server is cached to the current edge server.

Specifically, if all the edge servers have heterogeneous reliability, in Case 1, the replica of the complete file cluster $\Phi_i$ is cached. The additional space overhead is $\Delta c_i = \text{size}(\Phi_i - \Omega_{\bar{k}} \cap \Phi_i)$. The file availability is improved from $1 - \Pi_{s_k \in \kappa_i}(1 - r_k)$ to $1 - (1 - r_{\bar{k}})\Pi_{s_k \in \Lambda_i}(1 - r_k)$, where $\Lambda_i$ denotes a set of previous servers that cache the replica of $\Phi_i$.

In Case 2, a non-cached portion of the file cluster $\Phi_i$ is cached. In deduplication caching, some previous server (denoted as $\Theta_i$) may already have cached some data chunks of the file cluster $\Phi_i$. To save space, only the remaining portion of the file cluster $\Phi_i$, denoted as $\Delta c_i = \text{size}(\Phi_i - (\Omega \cup \Omega_{\bar{k}}) \cap \Phi_i)$, is cached. The file availability is acquired from $r_{\bar{k}}\Pi_{s_k \in \Theta_i} r_k$.

In Case 3, a portion of the file cluster $\Phi_i$ cached on all previous servers rather than on the current edge server $s_{\bar{k}}$ is cached. The size of the cache required is calculated according to $\Delta c_i = \text{size}(\Phi_i \cap \Omega)$. In this caching scheme, the reliability of the file cluster is improved from $r_{\bar{k}}\Pi_{s_k \in \Theta_i} r_k$ to $r_{\bar{k}}$.

The edge servers $s_k$ in S are sorted in advance in descending order of reliability, and $\Delta p_i$ denotes the reliability increment. It should be noted that MEAN can proactively create replicas of hot files to improve file availability and avoid server hotspots. In this way, requests for files can be effectively balanced among different servers, thereby avoiding over-commitment of a single server.

In an embodiment, some test examples are provided to facilitate visual explanation and understanding of the deduplication caching method of the present disclosure. It should be noted that the test examples provided in this embodiment are not intended to limit the deduplication caching method of the present disclosure, but rather to assist in understanding the beneficial effects of the deduplication caching method.

Test Settings:

In the test example, the prototype system of MEAN includes a cloud and an edge cluster to simulate the file retrieval behavior of edge caching. The cloud is deployed on an elastic cloud server (ECS), provided with 8 virtual central processing units (vCPUs), 2.5 GHz, a 16 GB random access memory (RAM), and a 40 GB solid state drive (SSD). The ECS runs Ubuntu Linux 16.04 ×64. The edge includes 11 VMs deployed on a personal computer (PC), provided with a 3.50 GHz Intel® Core™ i9-11900K 8-core CPU, a 64 GB RAM, and a 500 GB SSD. Each VM is provided with a 4 GB RAM and a 30 GB virtual disk drive (VDD), and runs Ubuntu Linux 20.04 ×64. The CPU die is shared by all the VMs. In the test example, 10 VMs act as edge cache servers, and the remaining one acts as a data requester to retrieve files from these edge servers or the cloud. The existing iPerf and ping tools are used to measure network performance. The mean of the 10 tests shows that the bandwidth between the ECS and the local VM is 91.6 Mbps, with a ping value of 29.05 ms, while the bandwidth between any two local VMs is 1.27 Gbps, with a ping value of 0.42 ms.

A real dataset from Github is used to evaluate the performance of the mean. The dataset includes source codes in. zip format from 357 popular repositories. These repositories are randomly selected under some popular topics, such as Azure, Amazon Web Services, and Docker. Multiple versions of source codes are downloaded randomly from each repository. There are a total of 3,099 codes (files) in the dataset, with the maximum file size being 12.6 MB and the minimum file size being 2.74 KB. These files are divided into chunks with variable sizes. This method determines the boundaries of the chunks based on the content of bytes, and has been widely proven to be more effective than the method of dividing the files into chunks of a fixed size. The mean size of the chunks is 4.07 KB, and the deduplication ratio (the size after deduplication divided by the total size) is 46.99%. The popularity of each file is generated by the widely used Zipf distribution.

Comparative Methods:

HotDedup. It is an implementation of a HotDedup algorithm. The popularity of cache files is maximized with the capacity constraint. Deduplication is performed on these files in a global sense, with unique chunks evenly distributed across the servers.

PopF. The most popular cache file is selected. The "popularity first" policy is widely adopted by many edge caching systems. All chunks of the selected file are stored on a single server to improve file availability, and duplicate chunks are eliminated at the server level to improve space efficiency.

PopF 3R. Combined with replica fault tolerance, it improves file availability on the basis of PopF. The number of replicas is set to 3, which is the default value for many distributed storage systems.

Cloud_only: All requested files are retrieved from the cloud, rather than edge cache.

Test Indexes:

The test results are based on the mean of 10 rounds of testing. The reliability of the 10 servers defaults to [0.8; 0.5; 0.7; 0.7; 0.8; 0.6; 0.5; 0.9; 0.5], and the total storage capacity of the servers defaults to 20% of the dataset size. In each round of testing, 500 file retrieval requests are randomly generated based on the popularity of files in the dataset to evaluate the performance of different methods. Some servers are randomly shut down based on reliability, and files in the list are requested based on a Poisson distribution. Arrival rate $\lambda$ defaults to 90, which means the expected number of retrieval requests per minute. The test indexes include cache hit rate and mean retrieval latency.

Test Results:

The reliability of all the edge servers is set to a consistent value, and the value is changed from 0.5 to 1.0 to evaluate the impact of reliability on the cache performance. When the reliability is 1.0, MEAN is implemented using the algorithm corresponding to Scenario 1. Other reliability setting corresponds to the implementation algorithm in Scenario 2. The total cache capacity defaults to 20% of the dataset size. The results are shown in FIGS. 7(a) and 7(b).

Figure 7A:
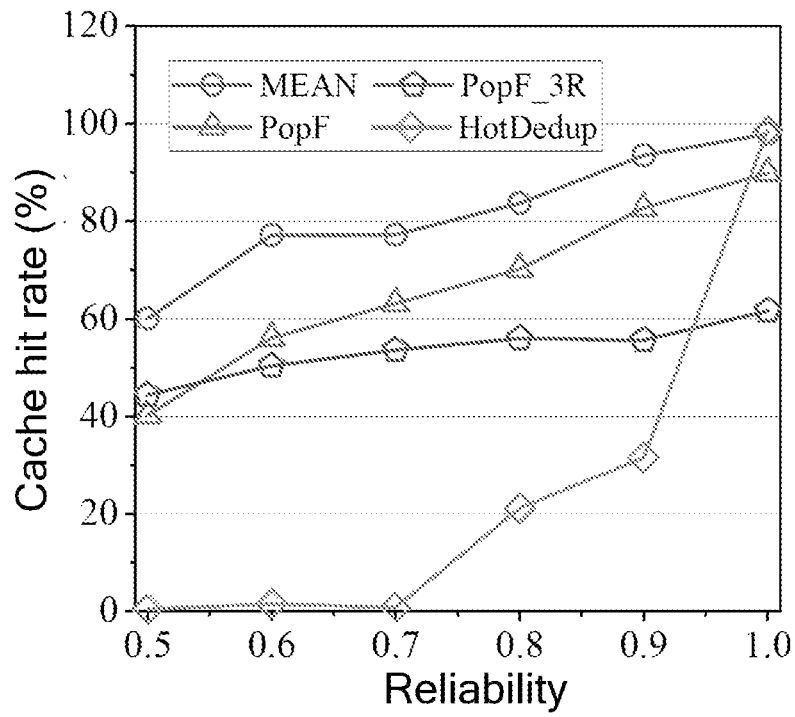
FIGS. 7(a) and 7(b) is a schematic diagram of an impact of server reliability on cache performance according to an embodiment of the present disclosure, where
Figure 7B:
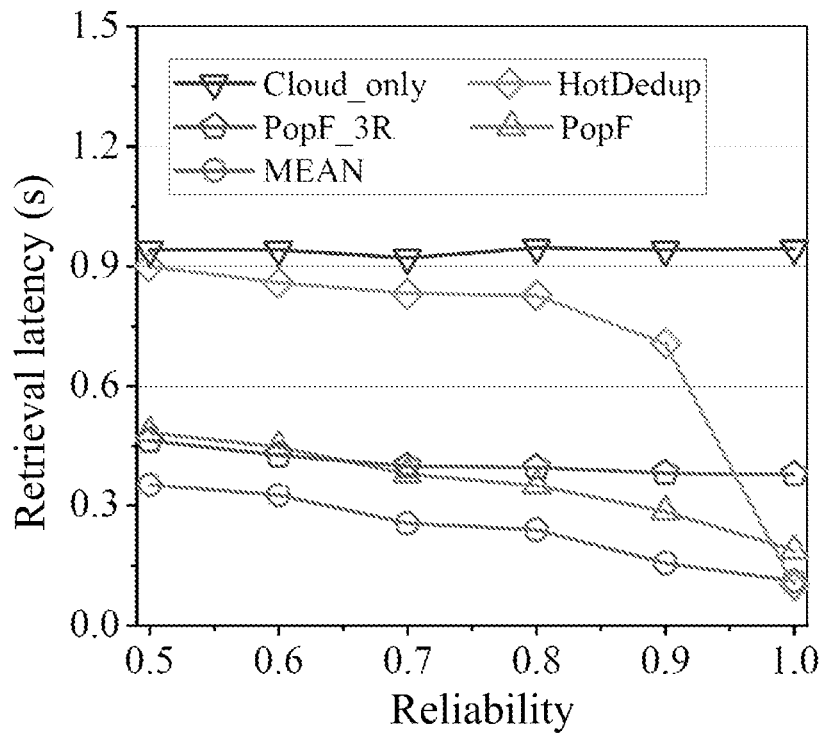

HotDedup is the most sensitive to server reliability, and the cache hit rate of HotDedu is relatively low when the server reliability is lower than 0.9, as shown in FIG. 7(a). Due to the sensitivity, the mean retrieval latency of HotDedu is only slightly lower than that of Cloud_only, over 0.7 s (FIG. 7(b)). HotDedu achieves the highest cache hit rate only when the servers are completely reliable. The reason is that evenly distributing data chunks between servers is not conducive to file availability. If a server fails, it will cause a large number of files to become unavailable, which seriously affects the cache hit rate.

The cache hit rates of PopF and PopF_3R in unreliable environments are slightly higher than that of HotDedup. Therefore, when the server reliability is lower than 0.9, the cache performance of PopF and PopF_3R is superior to that of HotDedup. In particular, when the reliability is 0.5, the cache hit rate of PopF_3R is slightly higher than that of PopF. The reason is that the 3-replica policy can improve file availability in unreliable environments. However, with the improvement of server reliability, the performance of PopF is significantly better than that of PopF. The reason is that when the server is more reliable, the performance gain from replication shrinks, and the large space footprint limits the number of edge cache files. In contrast, MEAN can maintain optimal cache performance under most reliability settings because MEAN can perform efficient deduplication and adjust the number of replicas based on different reliability scenarios.

Different cache capacities are set to evaluate their impacts on file request performance. The cache capacity of each edge server increases from 5% to 30% of the dataset size, and the server reliability remains at the default value. MEAN uses the algorithm in Scenario 3.

Figure 8A:
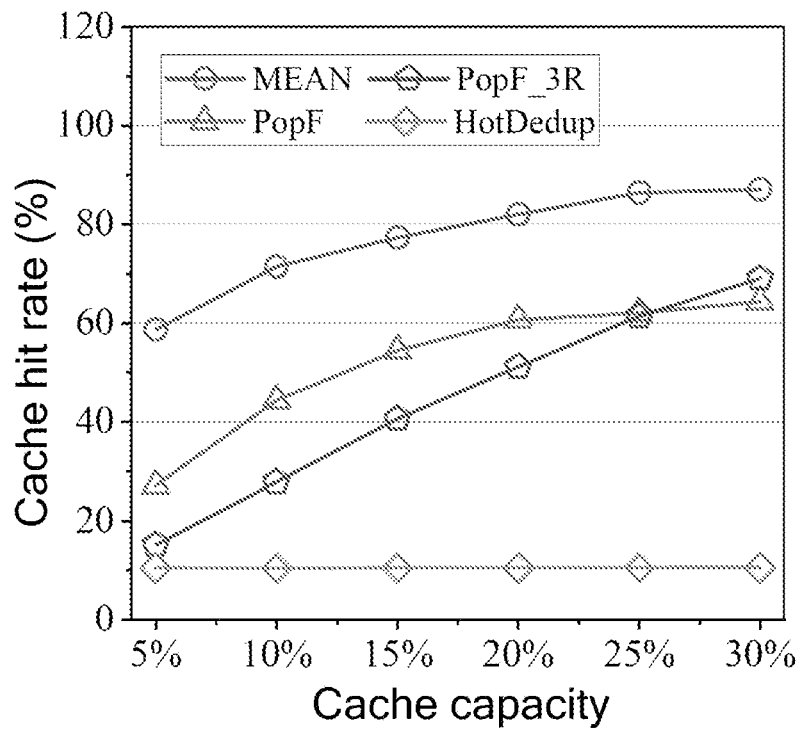
FIGS. 8(a) and 8(b) is a schematic diagram of an impact of a total cache capacity of servers on cache performance according to an embodiment of the present disclosure, where

FIG. 8(a) shows the impact of the edge cache capacity on the cache hit rate. MEAN considers both space efficiency and file availability, so its cache hit rate is the highest, followed by PopF and PopF_3R. When the edge cache capacity is small, PopF has a higher cache hit rate than PopF_3R. However, when the cache capacity exceeds 25%, PopF_3R has a higher cache hit rate than PopF. This is because when the cache space is large enough, the multi-replica scheme can improve file availability and cope with more server failures. However, neither of these methods can effectively utilize file similarity to improve space efficiency. As a result, their cache hit rate is below the mean. The cache hit rate of HotDedup is relatively low, only about 10%, because any failure of the related server will cause a hit failure. When the cache capacity is 30%, the cache hit rate difference between MEAN and HotDedup is as high as 77%.

Figure 8B:
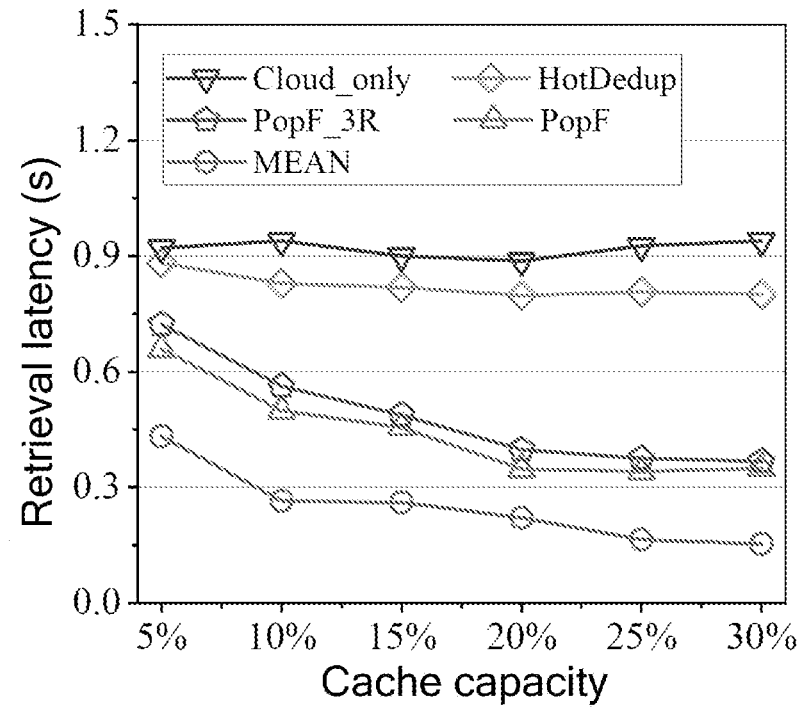

FIG. 8(b) shows the mean retrieval latency. In the baseline method, when all required files are retrieved from the cloud, the mean retrieval latency is approximately 0.9 s. Caching files on the edge can significantly reduce the latency of the retrieval process. When the cache capacity is only 5% of the dataset size, MEAN can reduce retrieval latency by more than 50%, with a mean retrieval latency of about 0.43 s. With the improvement of the edge caching capacity, the retrieval latency difference gradually increases. Specifically, when the cache capacity is 30% of the dataset size, the mean retrieval latency is about 0.15 s. In this case, MEAN reduces retrieval latency by 83% compared with the case of retrieving files from the cloud. Compared with HotDedup, MEAN reduces retrieval latency by 71%. The retrieval latency of MEAN is approximately half of the retrieval latency of PopF and PopF_3R.

Finally, different arrival rates $\lambda$ are set to evaluate the edge caching performance for retrieving 100 files. A larger arrival rate corresponds to more file requests during peak hours. The arrival rate $\lambda$ increases from 60 to 210, and the mean retrieval latency and throughput of the different methods are calculated.

Table 1 illustrates the mean retrieval latency corresponding to different arrival rates. As the arrival rate (i.e. $\lambda$) increases, the retrieval latency of all methods presents an upward trend, as file requests accumulate and compete with each other for the limited bandwidth resource. In addition, because the bandwidth of the backbone network in the cloud is scarcer than that of the edge network, the latency of Cloud-only increases faster than other methods. When the arrival rate reaches 210, the mean retrieval latency of Cloud_only reaches 9.351 s, nearly 37 times that of MEAN.

TABLE 1

| | Value of $\lambda$ | | | | | |
|---|---|---|---|---|---|---|
| | 60 | 90 | 120 | 150 | 180 | 210 |
| Cloud_only | 0.699 s | 0.764 s | 1.126 s | 2.067 s | 2.417 s | 9.351 s |
| HotDedup | 0.694 s | 0.758 s | 0.851 s | 1.091 s | 1.904 s | 7.622 s |
| PopF | 0.334 s | 0.346 s | 0.358 s | 0.364 s | 0.388 s | 0.424 s |
| PopF_3R | 0.383 s | 0.371 s | 0.379 s | 0.403 s | 0.434 s | 0.454 s |
| MEAN | 0.196 s | 0.220 s | 0.215 s | 0.223 s | 0.236 s | 0.253 s |

It should be understood that although the steps in FIG. 3 and FIG. 6 are sequentially displayed according to the arrows, these steps are not necessarily performed in the order indicated by the arrows. The execution order of these steps is not strictly limited, and these steps may be executed in other orders, unless clearly described otherwise. Moreover, at least some of the steps in FIG. 3 and FIG. 6 may include a plurality of sub-steps or stages. The sub-steps or stages are not necessarily executed at the same time, but may be executed at different times. The execution order of the sub-steps or stages is not necessarily carried out sequentially, but may be executed alternately with other steps or at least some of the sub-steps or stages of other steps.

Figure 9:
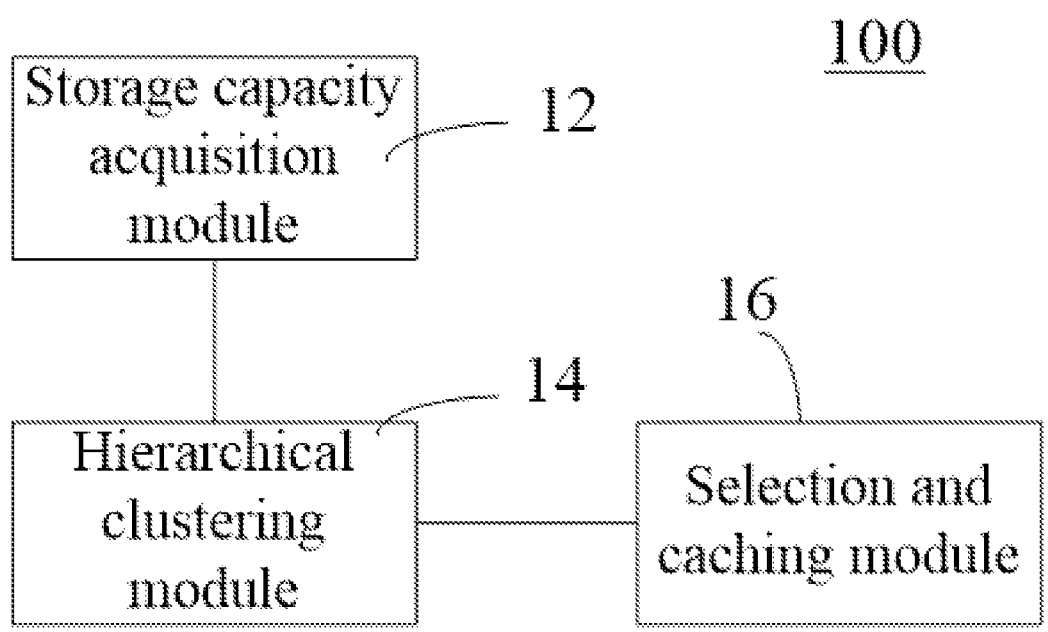
FIG. 9 is a block diagram of a system for deduplication caching using an unreliable edge resource according to an embodiment of the present disclosure.

Referring to FIG. 9, an embodiment of the present disclosure provides system 100 for deduplication caching using an unreliable edge resource, including storage capacity acquisition module 12, hierarchical clustering module 14, and selection and caching module 16. The storage capacity acquisition module 12 is configured to acquire a total storage capacity of all edge servers. The hierarchical clustering module 14 is configured to search for candidate cache files by an SHC method, and acquire file clusters of all the candidate cache files after clustering, where the candidate cache files each include a deduplicated data chunk. The selection and caching module 16 is configured to select, based on reliability of all the edge servers and by a heuristic algorithm, a file cluster from the file clusters to cache to the edge server until a size of cached content reaches the total storage capacity.

The system 100 of the present disclosure acquires the total storage capacity of all the edge servers, searches for the candidate cache files of all non-duplicate data chunks by the SHC method, and acquires the file clusters of all the candidate cache files generated through hierarchical clustering. The system selects a file cluster by the heuristic algorithm and caches the file cluster on the edge server until the size of the cached content reaches the total storage capacity. The system selects the cache file by comprehensively considering the popularity and similarity of the file and the reliability of the edge servers, so as to improve the availability of a hotter file. The system reduces the additional space occupied through deduplication and redundancy, and improves space efficiency. In addition, the system makes a trade-off between the file availability and space efficiency, thereby effectively improving the cache hit rate in the limited edge caching space.

In an embodiment, the system 100 for deduplication caching using an unreliable edge resource can further be configured to implement additional steps or functions corresponding to sub-steps in various embodiments of the method for deduplication caching using an unreliable edge resource.

For specific limitations on the system 100 for deduplication caching using an unreliable edge resource, please refer to the limitations on the method for deduplication caching using an unreliable edge resource, and details will not be repeated herein again.

An embodiment of the present disclosure further provides a computer device, including a memory and a processor. The memory is configured to store a computer program. The processor is configured to execute the computer program to acquire a total storage capacity of all edge servers; search for candidate cache files by an SHC method, and acquire file clusters of all the candidate cache files after clustering, where the candidate cache files each include a deduplicated data chunk; and select, based on reliability of all the edge servers and by a heuristic algorithm, a file cluster from the file clusters to cache to the edge server until a size of cached content reaches the total storage capacity.

It can be understood that the computer device includes not only the memory and the processor, but also other software and hardware components not mentioned herein. These components are determined based on the specific server models in different application scenarios, and will not be described in detail herein.

In an embodiment, the processor can further be configured to execute the computer program to implement additional steps or sub-steps in various embodiments of the method for deduplication caching using an unreliable edge resource.

An embodiment of the present disclosure further provides a computer-readable storage medium configured to store a computer program. The computer program is executed by a processor to acquire a total storage capacity of all edge servers; search for candidate cache files by an SHC method, and acquire file clusters of all the candidate cache files after clustering, where the candidate cache files each include a deduplicated data chunk; and select, based on reliability of all the edge servers and by a heuristic algorithm, a file cluster from the file clusters to cache to the edge server until a size of cached content reaches the total storage capacity.

In an embodiment, the computer program can further be executed by the processor to implement additional steps or sub-steps in various embodiments of the method for deduplication caching using an unreliable edge resource.

Those of ordinary skill in the art may understand that all or some of the procedures in the methods of the above embodiments may be implemented by a computer program instructing related hardware. The computer program may be stored in a nonvolatile computer-readable storage medium. When the computer program is executed, the procedures in the embodiments of the above methods may be performed. Any reference to a memory, storage, database or other medium used in the various embodiments of the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus DRAM (RDRAM), and a direct rambus dynamic RAM (DRDRAM).

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Only several embodiments of the present disclosure are described in detail above, but they should not therefore be construed as limiting the scope of the present disclosure. It should be pointed out that those of ordinary skill in the art can further make variations and improvements without departing from the conception of technical solutions in the present disclosure. These variations and improvements all fall within the protection scope of the present disclosure. Therefore, the protection scope of the present disclosure should be subject to the protection scope defined by the claims.

What is claimed is:

1. A method for deduplication caching using an unreliable edge resource, comprising the following steps:
   acquiring a total storage capacity of all edge servers;
   searching for candidate cache files by a similarity-based hierarchical clustering (SHC) method, and acquiring file clusters of all the candidate cache files after clustering, wherein the candidate cache files each comprise a deduplicated data chunk; and based on the file clusters and a reliability of all of the edge servers, selecting, by a heuristic algorithm, a file cluster from the file clusters to cache to an edge server until a size of cached content reaches the total storage capacity, wherein the searching for the candidate cache files by the SHC method, and the acquiring of the file clusters of all the candidate cache files after clustering comprises:

determining, by a hierarchical clustering method based on a Jaccard index, whether a sorting index of two files after clustering is greater than sorting indexes of the two files before clustering, in each iteration of an iterative clustering process;

if yes, merging the two files into a new cluster;

determining a heat rate of the new cluster, and recalculating a file availability based on a chunk location in the new cluster; and acquiring the file clusters after all iterative clustering is completed.

2. The method for deduplication caching using the unreliable edge resource according to claim 1, further comprising: calculating, when calculating the Jaccard index, an intersection and union of two file clusters by comparing chunk fingerprints drawn through a Bloom filter (BF).

3. The method for deduplication caching using the unreliable edge resource according to claim 2, wherein if all the edge servers are reliable, the selecting, by the heuristic algorithm, of the file cluster from the file clusters to cache to the edge server until the size of cached content reaches the total storage capacity comprises:

acquiring a BF sketch for each of the file clusters;

calculating the sorting index of each of the file clusters based on the BF sketch;

continuously selecting a file cluster with a maximum sorting index until the size of the cached content reaches the total storage capacity; and distributing all chunks of the cached content randomly and evenly to each of the edge servers within the total storage capacity.

4. The method for deduplication caching using the unreliable edge resource according to claim 2, wherein if all the edge servers have same reliability, the selecting, by the heuristic algorithm, of the file cluster from the file clusters to cache to the edge server until the size of cached content reaches the total storage capacity comprises:

caching a complete replica of any file cluster with a high heat rate to a current edge server.

5. The method for deduplication caching using the unreliable edge resource according to claim 2, wherein if all the edge servers are heterogeneously reliable, the selecting, by the heuristic algorithm, of the file cluster from the file clusters to cache to the edge server until the size of cached content reaches the total storage capacity comprises:

sorting the edge servers in descending order of reliability; and caching, in descending order of the sorting index, each of the file clusters to the edge servers, starting from an edge server with a highest reliability.

6. The method for deduplication caching using the unreliable edge resource according to claim 1, wherein if all the edge servers are reliable, the selecting, by the heuristic algorithm, of the file cluster from the file clusters to cache to the edge server until the size of cached content reaches the total storage capacity comprises:

acquiring a BF sketch for each of the file clusters;

calculating the sorting index of each of the file clusters based on the BF sketch;

continuously selecting a file cluster with a maximum sorting index until the size of the cached content reaches the total storage capacity; and distributing all chunks of the cached content randomly and evenly to each of the edge servers within the total storage capacity.

7. The method for deduplication caching using the unreliable edge resource according to claim 1, wherein if all the edge servers are reliable, the selecting, by the heuristic algorithm, of the file cluster from the file clusters to cache to the edge server until the size of cached content reaches the total storage capacity comprises:

acquiring a BF sketch for each of the file clusters;

calculating the sorting index of each of the file clusters based on the BF sketch;

continuously selecting a file cluster with a maximum sorting index until the size of the cached content reaches the total storage capacity; and distributing all chunks of the cached content randomly and evenly to each of the edge servers within the total storage capacity.

8. The method for deduplication caching using the unreliable edge resource according to claim 1, wherein if all the edge servers have same reliability, the selecting, by the heuristic algorithm, of the file cluster from the file clusters to cache to the edge server until the size of cached content reaches the total storage capacity comprises:

caching a complete replica of any file cluster with a high heat rate to a current edge server.

9. The method for deduplication caching using the unreliable edge resource according to claim 8, wherein if all the edge servers have same reliability, the selecting, by the heuristic algorithm, of the file cluster from the file clusters to cache to the edge server until the size of cached content reaches the total storage capacity further comprises:

caching a non-cached portion of the file cluster to the current edge server.

10. The method for deduplication caching using the unreliable edge resource according to claim 8, wherein if all the edge servers have same reliability, the selecting, by the heuristic algorithm, of the file cluster from the file clusters to cache to the edge server until the size of cached content reaches the total storage capacity further comprises:

caching a deduplicated portion of the file cluster dispersedly cached on other edge server to the current edge server.

11. The method for deduplication caching using the unreliable edge resource according to claim 1, wherein if all the edge servers have same reliability, the selecting, by the heuristic algorithm, of the file cluster from the file clusters to cache to the edge server until the size of cached content reaches the total storage capacity comprises:

caching a complete replica of any file cluster with a high heat rate to a current edge server.

12. The method for deduplication caching using the unreliable edge resource according to claim 1, wherein if all the edge servers are heterogeneously reliable, the selecting, by the heuristic algorithm, of the file cluster from the file clusters to cache to the edge server until the size of cached content reaches the total storage capacity comprises:

sorting the edge servers in descending order of reliability; and caching, in descending order of the sorting index, each of the file clusters to the edge servers, starting from an edge server with a highest reliability.

13. The method for deduplication caching using the unreliable edge resource according to claim 12, wherein the caching, in descending order of the sorting index, of each of the file clusters to the edge servers, starting from an edge server with a highest reliability comprises:
- caching a complete replica of any file cluster with a high heat rate to a current edge server;
- caching a non-cached portion of the file cluster to the current edge server; and
- caching a deduplicated portion of the file cluster dispersedly cached on other edge server to the current edge server.

14. The method for deduplication caching using the unreliable edge resource according to claim 1, wherein if all the edge servers are heterogeneously reliable, the selecting, by the heuristic algorithm, of the file cluster from the file clusters to cache to the edge server until the size of cached content reaches the total storage capacity comprises:
- sorting the edge servers in descending order of reliability; and caching, in descending order of the sorting index, each of the file clusters to the edge servers, starting from an edge server with a highest reliability.

15. A system for deduplication caching using an unreliable edge resource, comprising the following modules:
- a storage capacity acquisition module configured to acquire a total storage capacity of all edge servers;
- a hierarchical clustering module configured to search for candidate cache files by an SHC method, and acquire file clusters of all the candidate cache files after clustering, wherein the candidate cache files each comprise a deduplicated data chunk; and
- a selection and caching module configured to select, based on the file clusters and a reliability of all of the edge servers and by a heuristic algorithm, a file cluster from the file clusters to cache to an edge server until a size of cached content reaches the total storage capacity,
- wherein the searching for the candidate cache files by the SHC method, and the acquiring of the file clusters of all the candidate cache files after clustering comprises:
  - determining, by a hierarchical clustering method based on a Jaccard index, whether a sorting index of two files after clustering is greater than sorting indexes of the two files before clustering, in each iteration of an iterative clustering process;
  - if yes, merging the two files into a new cluster;
  - determining a heat rate of the new cluster, and recalculating a file availability based on a chunk location in the new cluster; and
  - acquiring the file clusters after all iterative clustering is completed.

16. A method for deduplication caching using an unreliable edge resource, comprising the following steps:
- acquiring a total storage capacity of all edge servers;
- searching for candidate cache files by a similarity-based hierarchical clustering (SHC) method, and acquiring file clusters of all the candidate cache files after clustering, wherein the candidate cache files each comprise a deduplicated data chunk; and
- based on the file clusters and a reliability of all of the edge servers, selecting, by a heuristic algorithm, a file cluster from the file clusters to cache to an edge server until a size of cached content reaches the total storage capacity,
- wherein if all the edge servers have same reliability, the selecting, by the heuristic algorithm, of the file cluster from the file clusters to cache to the edge server until the size of cached content reaches the total storage capacity comprises:
- caching a complete replica of any file cluster with a high heat rate to a current edge server.

17. The method for deduplication caching using the unreliable edge resource according to claim 16, wherein if all the edge servers have same reliability, the selecting, by the heuristic algorithm, of the file cluster from the file clusters to cache to the edge server until the size of cached content reaches the total storage capacity further comprises:
- caching a non-cached portion of the file cluster to the current edge server.

18. The method for deduplication caching using the unreliable edge resource according to claim 16, wherein if all the edge servers have same reliability, the selecting, by the heuristic algorithm, of the file cluster from the file clusters to cache to the edge server until the size of cached content reaches the total storage capacity further comprises:
- caching a deduplicated portion of the file cluster dispersedly cached on other edge server to the current edge server.

* * * * *